United States Patent
Muralidhar et al.

(10) Patent No.: US 9,768,636 B2
(45) Date of Patent: *Sep. 19, 2017

(54) OFFSET CURRENT IMPLEMENTATION FOR BATTERY CHARGER

(71) Applicant: THERMO KING CORPORATION, Minneapolis, MN (US)

(72) Inventors: Ashok Muralidhar, Eagan, MN (US); Matt Nelson, Cottage Grove, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/204,730

(22) Filed: Jul. 7, 2016

(65) Prior Publication Data

US 2016/0322836 A1    Nov. 3, 2016

Related U.S. Application Data

(63) Continuation of application No. 14/655,024, filed as application No. PCT/US2013/078426 on Dec. 31, 2013, now Pat. No. 9,407,108.

(Continued)

(51) Int. Cl.
*H02J 7/04* (2006.01)
*H02J 7/00* (2006.01)
(Continued)

(52) U.S. Cl.
CPC ............. *H02J 7/007* (2013.01); *B60R 16/03* (2013.01); *F25D 11/003* (2013.01);
(Continued)

(58) Field of Classification Search
CPC ....................................................... H02J 7/007
(Continued)

(56) References Cited

U.S. PATENT DOCUMENTS 3,974,660 A   8/1976   Farr
5,262,704 A   11/1993  Farr
(Continued)

FOREIGN PATENT DOCUMENTS

CN   201604567    10/2010
JP   2005098623    4/2005
(Continued)

OTHER PUBLICATIONS

Supplementary European Search Report issued in corresponding European Application No. 13868386.7 dated Sep. 14, 2016 (5 pages).

(Continued)

*Primary Examiner* — Richard V Muralidar
(74) *Attorney, Agent, or Firm* — Hamre, Schumann, Mueller & Larson, P.C.

(57) ABSTRACT

A transport refrigeration unit (TRU) battery charging system includes a programmable transport refrigeration system (TRS) Controller, a TRU battery and a programmable battery charger (BC) programmed to transfer electrical current to the TRU battery via a predetermined current path through the programmable TRS Controller in response to a value of offset current drawn from the TRU battery by the programmable TRS Controller and subsequently communicated to the programmable BC by the programmable TRS Controller. The programmable TRU battery charger allows for a dynamic load characterization of the programmable IRS Controller and accessory loads based on programmable TRU battery charger internal shunt current measurements and programmable TRS Controller internal shunt current measurements to allow the programmable TRU battery charger to function properly with all intended modes of operation.

16 Claims, 4 Drawing Sheets

Related U.S. Application Data

(60) Provisional application No. 61/747,436, filed on Dec. 31, 2012.

(51) Int. Cl.
  *H02H 7/18* (2006.01)
  *B60R 16/03* (2006.01)
  *F25D 11/00* (2006.01)
  *F25D 29/00* (2006.01)

(52) U.S. Cl.
  CPC .......... *F25D 29/003* (2013.01); *H02J 7/0052* (2013.01); *H02J 7/0077* (2013.01); *H02J 2007/0096* (2013.01)

(58) Field of Classification Search
  USPC ................ 320/104, 123, 134, 152, 157–159, 320/162–164; 307/10.7
  See application file for complete search history.

(56) References Cited

U.S. PATENT DOCUMENTS

| | | | |
|---|---|---|---|
| 5,303,560 A | 4/1994 | Hanson et al. | |
| 5,557,941 A | 9/1996 | Hanson et al. | |
| 5,596,878 A | 1/1997 | Hanson et al. | |
| 5,623,197 A | 4/1997 | Roseman et al. | |
| 6,321,550 B1 | 11/2001 | Chopko et al. | |
| 6,690,140 B2* | 2/2004 | Larson | H02J 7/1453 307/10.1 |
| 7,750,602 B2 | 7/2010 | Asada | |
| 7,765,831 B2 | 8/2010 | Rodriguez et al. | |
| 7,791,310 B2* | 9/2010 | Luz | G01R 31/36 307/10.1 |
| 8,134,340 B2 | 3/2012 | Park | |
| 8,314,588 B2 | 11/2012 | Lazarovich et al. | |
| 8,330,412 B2 | 12/2012 | Lattin | |
| 9,407,108 B2* | 8/2016 | Muralidhar | B60P 3/20 |
| 2004/0231831 A1 | 11/2004 | Houck et al. | |
| 2005/0237025 A1 | 10/2005 | Osswald | |
| 2006/0260335 A1 | 11/2006 | Montuoro et al. | |
| 2007/0151273 A1 | 7/2007 | Nelson et al. | |
| 2010/0274604 A1 | 10/2010 | Crilly | |
| 2012/0015997 A1 | 1/2012 | Miki et al. | |
| 2012/0038316 A1 | 2/2012 | Elias et al. | |
| 2012/0159971 A1 | 6/2012 | Fink et al. | |
| 2013/0000342 A1 | 1/2013 | Blasko et al. | |
| 2013/0248165 A1* | 9/2013 | Kandasamy | F25D 29/003 165/271 |

FOREIGN PATENT DOCUMENTS

| | | |
|---|---|---|
| KR | 100629106 | 9/2006 |
| KR | 20100070594 | 6/2010 |
| WO | 2010101960 | 9/2010 |
| WO | 2010104960 | 9/2010 |
| WO | 2012138500 | 10/2012 |

OTHER PUBLICATIONS

Chinese Office Action in corresponding Chinese Application No. 201380073945.X issued Apr. 15, 2016.

International search report for International application No. PCT/US2013/078426, dated Apr. 24, 2014 (3 pages).

Written opinion for International application No. PCT/US2013/078426, dated Apr. 24, 2014 (5 pages).

International Search Report for International Application No. PCT/US2014/072316, dated Mar. 25, 2015 (3 pages).

* cited by examiner

OFFSET CURRENT IMPLEMENTATION FOR BATTERY CHARGER

FIELD

The embodiments disclosed herein relate generally to a transport refrigeration unit (TRU) of a transport refrigeration system (TRS). More particularly, the embodiments relate to a system and method for dynamically characterizing the load connected to a TRU battery charger, thus allowing the TRU battery charger to accurately adjust its output current based on the dynamically changing load.

BACKGROUND

A transport refrigeration system (TRS) is generally used to control an environmental condition (e.g., temperature, humidity, air quality, and the like) within a refrigerated transport unit (e.g., a container on a flat car, an intermodal container, etc.), a truck, a box car, or other similar transport units (TUs). A TRS may include a transport refrigeration unit that is attached to the TU and provides refrigeration within a cargo space of the TU. The TRU may include, without limitation, a compressor, a condenser, a thermo expansion valve, an evaporator and fans and/or blowers to facilitate heat exchange between the cargo space of the TU and the environment surrounding the TU.

In a cooling cycle, a refrigerant is compressed by the compressor and subsequently flows into the condenser. In the condenser, the compressed refrigerant can release heat to the environment. Then the refrigerant can pass through the thermo expansion valve where it can subsequently flow into the evaporator to absorb heat from air in a space desired to be cooled. A fan and/or blower can be used to facilitate heat exchange between the refrigerant and the environment when the refrigerant is in the condenser and the evaporator by creating air flow through the condenser and the evaporator.

SUMMARY

The embodiments disclosed herein relate generally to a TRU of a TRS. More particularly, the embodiments relate to a system and method for dynamically characterizing the load connected to a TRU battery charger, thus allowing the TRU battery charger to accurately adjust its output current based on the dynamically changing load.

That is, the embodiments described herein are directed to a system and method for adjusting the current output of a TRU programmable/smart battery charger in a manner that dynamically accounts for varying load conditions, thus increasing the accuracy, efficiency and reliability of charging algorithms programmed into the smart battery charger. According to one aspect, the varying load conditions are dynamically characterized in response to an offset current drawn from the TRU battery during a null mode measurement of the battery voltage.

The embodiments described herein provide a system and method for accurately estimating an open circuit voltage of a TRU battery; efficiently and effectively transition between a bulk current charging mode, an absorption mode and a float mode of a TRU battery charger; dynamically change a load on the TRU battery charger; and multi-tasking a single output terminal of the TRU battery charger to supply accessory loads to components of the TRU and to charge the TRU battery.

According to one embodiment, a transport refrigeration unit (TRU) battery charging system comprises a programmable TRS Controller, a TRU battery and a programmable/smart battery charger configured to transfer electrical current to the TRU battery via a predetermined current path through the TRS Controller in response to a value of offset current drawn from the TRU battery by the TRS Controller during a null mode measurement of the TRU battery voltage and subsequently communicated to the programmable battery charger.

According to another embodiment, a method of operating a transport refrigeration unit (TRU) battery charging system comprises programming a TRS Controller to measure a value of offset current drawn from a TRU battery by the programmable TRS Controller during a null mode voltage measurement of the TRU battery by a programmable/smart battery charger connected to the TRU battery via a current path through the programmable TRS Controller; and communicating the value of offset current to the programmable battery charger such that the smart battery charger operates in a desired stage of charging based on the value of offset current.

DRAWINGS

The foregoing and other features, aspects and advantages of the invention are apparent from the following detailed description taken in conjunction with the accompanying drawings in which like characters represent like parts throughout the drawings, wherein.

Figure 3:
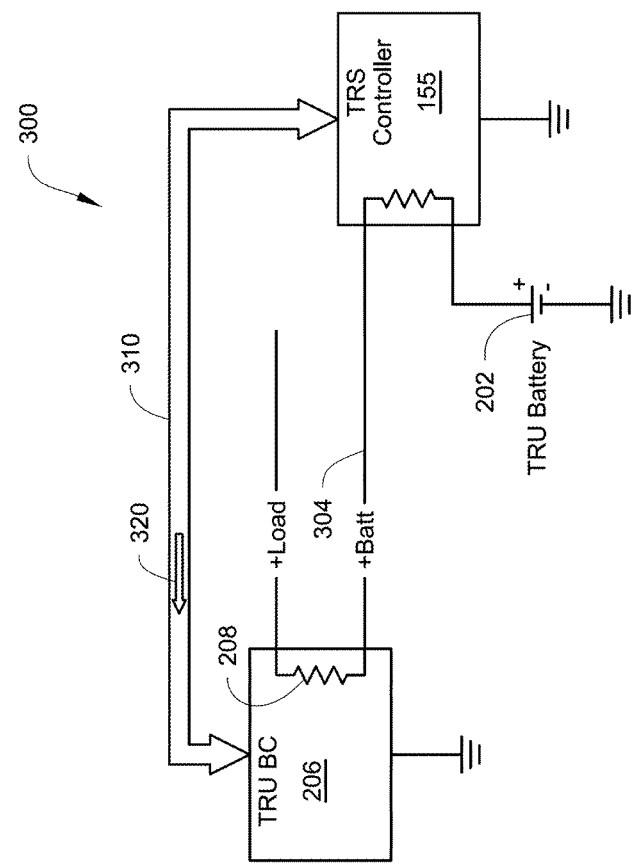
Figure 4:
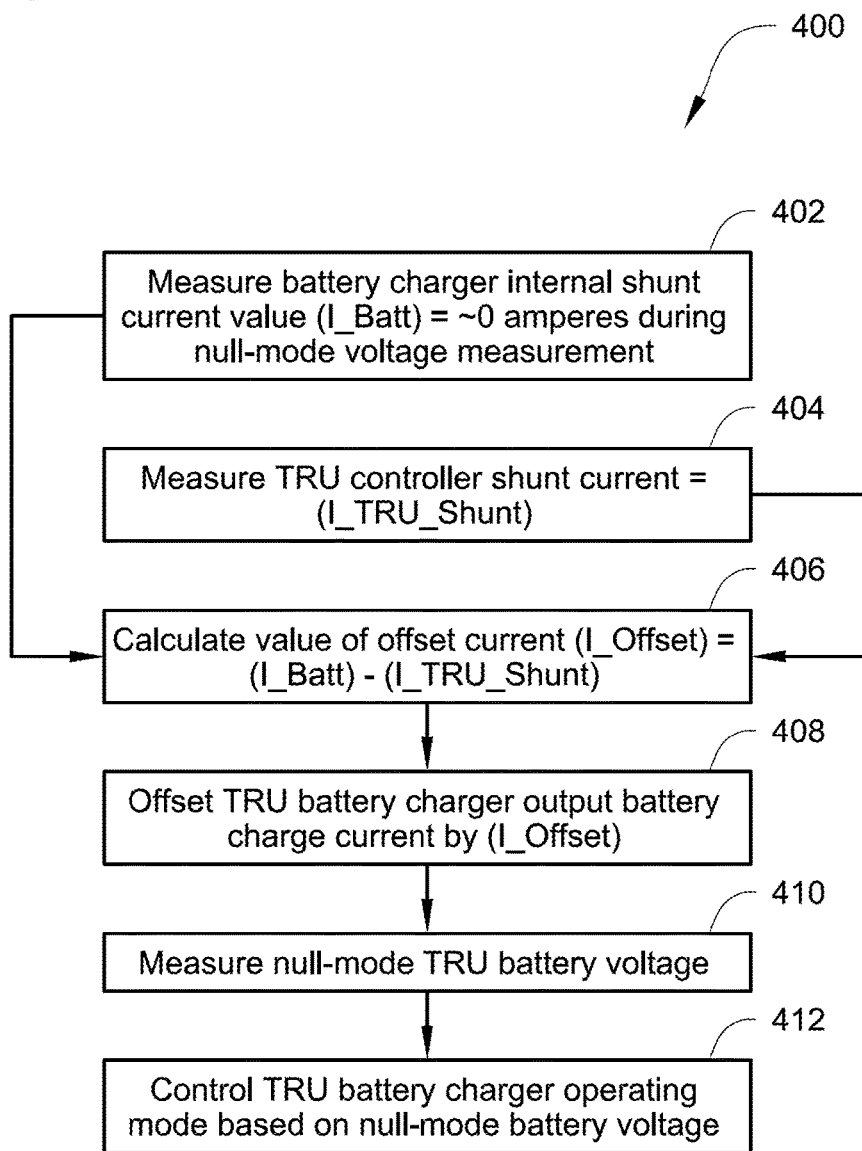

FIG. 3 is a schematic illustration showing data communication between a programmable TRS Controller and a smart/programmable battery charger, according to one embodiment; and FIG. 4 is a flow chart showing a method of dynamically characterizing a load connected to a smart TRU battery charger, thus allowing the smart TRU battery charger to accurately adjust its output current based on the dynamically changing load, according to one embodiment.

While the above-identified drawing figures set forth alternative embodiments, other embodiments are also contemplated, as noted in the discussion. In all cases, this disclosure presents illustrated embodiments by way of representation and not limitation. Numerous other modifications and embodiments can be devised by those skilled in the art which fall within the scope and spirit of the principles of this disclosure.

DETAILED DESCRIPTION

Figure 1:
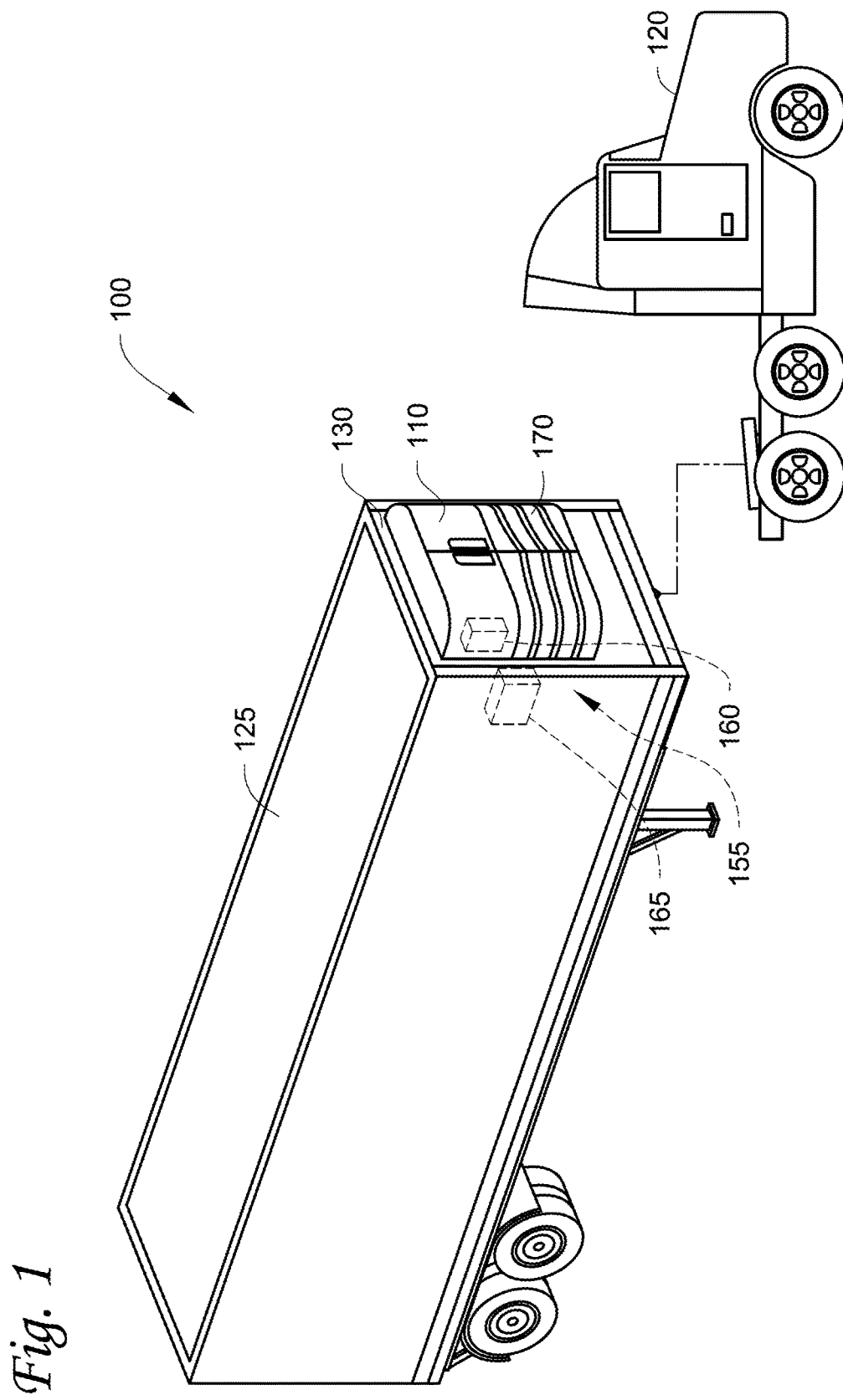
FIG. 1 illustrates one embodiment of a TRS comprising a TRU.

FIG. 1 illustrates one embodiment of a TRS 100 for a transport unit (TU) 125 that is attached to a tractor 120. The TRS 100 includes a TRU 110 that controls refrigeration within the TU 125. The TRU 110 is disposed on a front wall 130 of the TU 125. A tractor 120 is attached to and is configured to tow the transport unit 125. It will be appreciated that the embodiments described herein are not limited to trucks and trailer units, but can just as easily apply to any other suitable temperature controlled apparatuses such as a ship board container, an air cargo container or cabin, an over the road truck cabin, among others. The TRU 100 may comprise a programmable TRS Controller 155 that may comprise a single integrated control unit 160 or that may comprise a distributed network of TRS control elements 160, 165. The number of distributed control elements in a given network will depend upon the particular application of the principles described herein. The TRU 100 may further comprise a generator set 170 including without limitation, a prime mover (not shown), a generator (e.g., a three phase AC generator) (not shown), a TRU battery (not shown) and a programmable/smart TRU battery charger (not shown) that together are configured to power the TU 125 while in transit.

Figure 2:
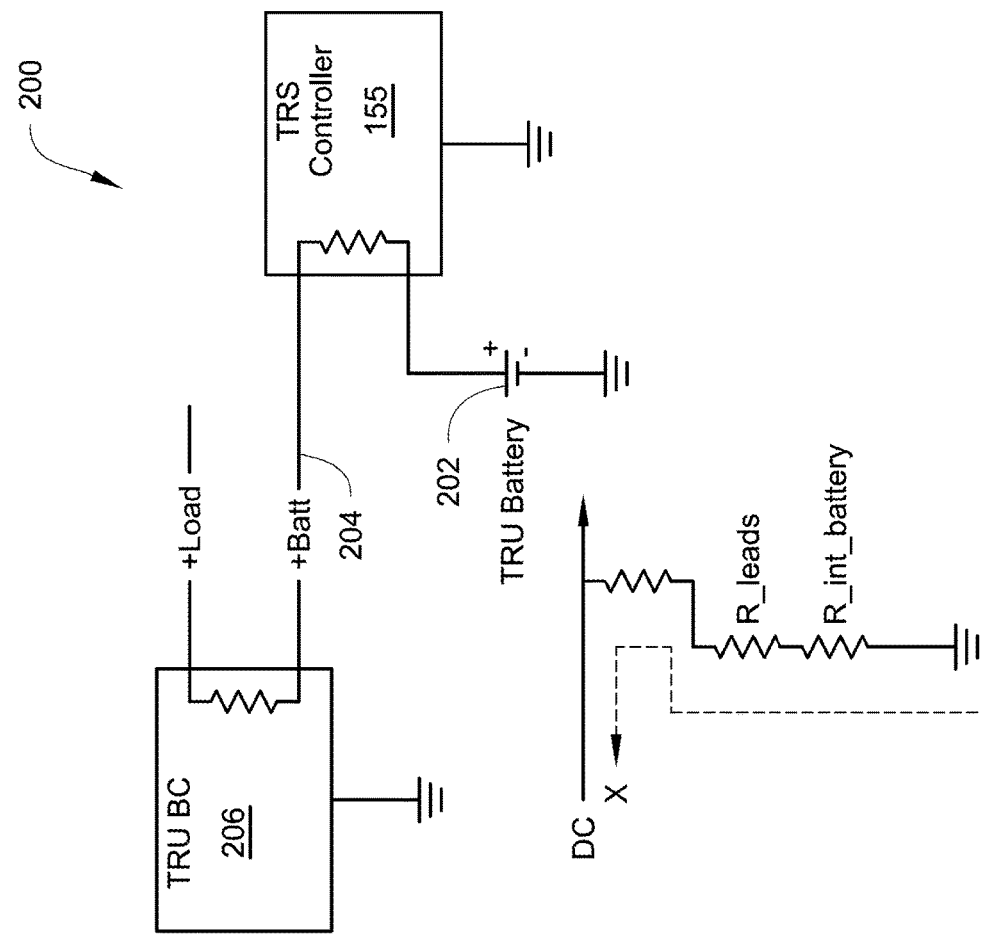
FIG. 2 is a schematic illustration of TRU battery charging system, according to one embodiment.

FIG. 2 is a schematic illustration of a TRU battery charging system 200, according to one embodiment. The programmable TRS Controller 155 is connected to a TRU battery 202 and provides a current path 204 between the TRU battery 202 and a programmable/smart TRU battery charger 206 according to the principles described herein. In some embodiments, the TRU battery 202 can be a ~12 volt battery.

Because the current path 204 between the smart battery charger 206 and the TRU battery 202 passes through the programmable TRS Controller 155, the TRU battery voltage measured by the smart TRU battery charger 206 during a null-mode voltage measurement may actually be lower than the measured value due to an offset current drawn by the TRS Controller 155 from the TRU battery 202 as the smart TRU battery charger 206 current output transitions to, for example, about 0 Amperes. As depicted for one embodiment in FIG. 2, an offset current drawn by the TRS Controller 155 that may include additional loads, can be about 6 Amperes. Thus, it can be appreciated that during normal operation when a null-mode voltage measurement is performed by the smart TRU battery charger 206, the TRU battery voltage may actually be lower than the measured TRU battery voltage X due to the offset current being drawn by the TRS Controller 155 from the battery 202 as the smart TRU battery charger output drops to about 0 Amperes, as stated herein. For example, in one embodiment, when measured by the TRU battery charger 206, the measured TRU battery voltage X can be a negative voltage offset up to about ~2 volts.

Since the foregoing negative voltage effect may cause the null-mode battery voltage measurement to be lower than what it actually is, and potentially lower than a predetermined low battery voltage threshold of the smart TRU battery charger 206, it may cause the TRU charger 206 to provide a lower than desired output current. Accordingly, this negative effect may cause the null-mode battery voltage measurement to be lower than, for example, ~11.5 VDC which may set the low battery voltage threshold of the battery charger in a manner such that the smart TRU battery charger 206 only generates a configurable amount of output current (e.g., ~5 Amperes). In some embodiments, the configurable amount of output current can be between ~0 to ~30 Amperes. For example, in one embodiment, the configurable amount of output current can be set to ~5 Amperes as discussed above. In another embodiment, the configurable output current can be set to ~20 Amperes. This resultant operating condition may continue to deplete the TRU battery 202 as controller loads may be above ~7 Amperes based on the mode of operation. As such, the TRU system 200 potentially may not restart under certain operating conditions such as, without limitation, "on demand automatic start" conditions or shut down from/while in certain continuous operation conditions.

FIG. 3 is a schematic illustration of a TRU battery charging system 300 showing data communication between the programmable TRS Controller 155 and the smart/programmable TRU battery charger 206, according to one embodiment. According to one embodiment, a controller area network (CAN) interface/bus 310 is employed to provide data communication between the TRS Controller 155 and the TRU battery charger 206. The value of offset current drawn from the TRU battery 202 during null mode measurement of the TRU battery voltage is then provided to the TRU battery charger 206 over the CAN interface/bus 310. This value of offset current will allow the TRU battery charger 206 to adjust its output to dynamically account for varying load conditions, and thereby operate in the correct stage of its programmed/smart charging algorithm as well as to accurately measure the TRU battery voltage level. According to one aspect, the measured offset current value is sent to the TRU battery charger 206 about once every few milliseconds, regardless of operating mode.

While FIG. 3 illustrates that data communication between the TRS Controller 155 and the TRU battery charger 206 is employed via a CAN interface/bus 310, it is appreciated that in other embodiments data communication between the TRS Controller 155 and the TRU battery charger 206 can be employed via a serial communication bus, an $I^2C$ communication bus, a wireless communication bus (e.g., Bluetooth, ZigBee, Infrared, etc.), etc.

According to one embodiment, the foregoing measured offset current value can be used by the TRU battery charger 206 during null mode measurement of TRU battery voltage to determine what charging mode the TRU battery charger 206 should be operating in. According to one aspect, detection of a low TRU battery voltage by the TRU battery charger 206 can set predetermined low voltage operating conditions. According to another aspect, detection of an open circuit/disconnected battery condition by the TRU battery charger 206 can set predetermined open battery operating conditions, based on whether the TRU battery 202 is still connected, was disconnected while running, or is subject, for example, to a damaged battery cable. According to yet another aspect, detection of a reverse TRU battery polarity condition by the TRU battery charger 206 can be used by the battery charger 206 to protect itself from electrical damage.

According to one embodiment, the smart TRU battery charger 206 can be programmed with a three-stage charging algorithm that causes the TRU battery charger 206 to operate in a bulk current charging mode that delivers as much current as possible into the TRU battery 202, an absorption mode that causes the TRU battery charger 206 to continue charging the TRU battery 202 subsequent to bulk current charging, and a float mode in which the TRU battery charger 206 will continue to charge/maintain the TRU battery 202 at lower currents and a lower voltage to prevent TRU battery overcharging and out gassing.

In some embodiments, the TRU battery charger 206 can operate in the bulk current charging mode about 5% of the run time, in the absorption mode about 30% of the run time, in the float mode about 65% of the run time. For example, in on embodiment, when the run time is about 1 hour, the TRU battery charger 206 can operate in the bulk current charging mode for about 1 minute, the absorption mode for about 15 minutes and in the float mode for about 44 minutes.

Accurate characterization of loading on the TRU battery charger 206 during normal operation can be important since during normal operation when the null-mode measurement is made, the TRU battery voltage may actually be lower due to an offset current being drawn by the TRS Controller 155 from the TRU battery 202 as the TRU battery charger 206 output drops to about 0 Amperes. This condition is exemplified at the bottom center portion of FIG. 2 that shows an offset current of ~6 Amperes drawn by the TRS Controller 155. This negative effect can cause the null-mode TRU battery voltage measurement to be lower than what it actually is, potentially lower than a predetermined low battery voltage threshold of the charger only outputting, for example, ~5 Amperes. This condition may continue to deplete the TRU battery 202 as TRS Controller loads can be above ~7 Amperes based on mode of operation, causing the TRU 100 to potentially fail to restart during certain conditions or to shut down from/while in certain continuous operation conditions.

A failure to take into consideration the foregoing offset current can disadvantageously prevent the TRU battery charger 206 to enter the float mode of the three-stage algorithm described herein, since the current being sourced from the TRU battery charger 206 to charge the TRU battery 202 is in addition to the offset current required to run the TRS Controller 155. According to one embodiment, this value may be about 4 to 7 Amperes, based on various run conditions. This value is above the transition point (e.g., ~2.5 Amperes) to charge the TRU battery 202, according to one embodiment. Further, a negative current flow from the TRU battery 202 to supply power to the TRS Controller 155 and/or additional loads may cause issue with the open battery detection operation implemented within the TRU battery charger 206.

More specifically, the TRS Controller 155 is programmed to provide shunt current information to the TRU battery charger 206 via the CAN communication interface/bus 310. This shunt current information can be depicted as I_TRU_Shunt 320 in FIG. 3. The shunt current 320 can be dynamic and may change based on operating modes of the TRU 100 shown in FIG. 1.

In some embodiments, the shunt current information can be broadcasted by the TRS Controller 155 to the TRU battery charger 206 in real-time. In other embodiments, the shunt current information can be broadcasted by the TRS Controller 155 to the TRU battery charger, for example, at a rate of once every millisecond up to once every hour. In some embodiments, the shunt current information can be broadcasted by the TRS Controller 155 to the TRU battery charger, for example, once every second. That is, the broadcast rate of the shunt current information from the TRS Controller 155 to the TRU battery charger 206 can be set based on the requirements of the application and to prevent flooding the CAN communication interface/bus 310 with shunt current information while still allowing the TRU battery charger 206 to accurately adjust its output current based on the dynamically changing load.

Also, in some embodiments, the shunt current information can be a real/measured shunt current value. In other embodiments, the shunt current information can be a filtered value based off of the real/measured value. The shunt current information can be filtered via a software and/or hardware filter to remove, for example, noise and to provide a more accurate measurement value. In some embodiments, the shunt current information can be filtered via a resistor-capacitor (RC) filter. The shunt current information can be filtered by, for example, one or more of the TRS Controller 155, the TRU battery charger 206, a separate hardware/software filter device, etc.

According to one embodiment, the TRU battery charger 206 can be programmed with algorithmic software to calculate the value of offset current (I_Offset), where $I\_Offset = I\_Batt - I\_TRU\_Shunt$, where the I_Batt value is known by the TRU battery charger 206 due to an internal current measurement shunt 208. The TRU battery charger 206 will then use the calculated offset current value I_Offset to offset the output battery charge current. It will be appreciated that this process allows for a proper null-mode measurement value by not having negative current flow from the battery to power the TRU/additional loads. According to one embodiment, the TRS Controller 155 can continue to function in the same manner, regardless of the type of charging system, such as without limitation, a battery charger electronic power supply or a battery charging DC alternator, employed for utilizing TRU shunt current measurements.

In summary explanation, a transport refrigeration unit (TRU) battery charging system comprises a programmable TRS Controller 155, a TRU battery 202 and a programmable/smart battery charger 206 programmed and configured to transfer electrical current to the TRU battery 202 via a predetermined current path 304 through the TRS Controller 155 in response to a value of offset current drawn from the TRU battery 202 by the TRS Controller 155 during a null mode measurement of the TRU battery voltage and subsequently communicated to the programmable battery charger 206. Algorithmic software programmed into the TRU battery charger 206 allows for a dynamic load characterization of the TRS Controller 155 and accessory loads based on TRU battery charger internal shunt current measurements and TRS Controller internal shunt current measurements to allow the battery charger 206 to function properly with all intended modes of operation.

FIG. 4 is a flow chart showing a method 400 of dynamically characterizing a load connected to a smart TRU battery charger, thus allowing the smart TRU battery charger to accurately adjust its output current based on the dynamically changing load, according to one embodiment. The method commences by first measuring the TRU battery charger internal shunt current value (I_Batt) at 402. Prior to, simultaneously with, or subsequent to measuring the TRU battery charger internal shunt current value at 402, the TRS Controller measures its own shunt current (I_TRU_Shunt) at 404. The TRS Controller then communicates the value of its own shunt current to the TRU battery charger, wherein the TRU battery charger calculates the requisite value of offset current (I_Offset) based on I_Batt and I_TRU_Shunt at 406. Next, at 408, the TRU battery charger offsets its output battery charge current by the value of offset current (I_Offset). This then allows for an accurate measurement of null-mode TRU battery voltage at 410. The desired operating mode for the TRU battery charger is then accurately controlled based on the correct null-mode TRU battery voltage at 412.

The principles and embodiments described herein provide numerous advantages. Some of these advantages include, without limitation, increased battery charging accuracy, increased load sourcing accuracy and increased operating mode accuracy. Further, since the TRU battery charger 206 is programmable, it may be programmed to also measure and dynamically characterize operating conditions of TRU loads such as an AC generator output signal voltage, phase and frequency that provides power to the TRU 100. It will be appreciated that the TRU battery charger 206 may be put into a sleep mode or a deep sleep mode in response to instructions from the TRS Controller 155 via the CAN interface/bus 310 during periods where battery charging and/or load sourcing may not be required.

Aspects:

It is noted that any of aspects 1-9, 10 and 11-16 can be combined.

1. A transport refrigeration unit (TRU) battery charging system, comprising:

a programmable transport refrigeration system (TRS) Controller;

a TRU battery; and a programmable battery charger (BC) programmed to transfer electrical current to the TRU battery via a predetermined current path through the programmable TRS Controller in response to a value of offset current drawn from the TRU battery by the programmable TRS Controller and subsequently communicated to the programmable BC by the programmable TRS Controller.

2. The TRU battery charging system according to aspect 1, wherein the programmable BC is further programmed to transfer electrical current to the TRU battery via the predetermined current path through the programmable TRS Controller in response to the value of offset current drawn from the TRU battery by the programmable TRS Controller during a null-mode measurement of the TRU battery voltage.

3. The TRU battery charging system according to aspect 2, wherein the programmable BC is further programmed to operate in at least one of a bulk current mode, an absorption mode and a float mode based on the value of offset current drawn from the TRU battery by the programmable TRS Controller during the null-mode measurement of the TRU battery voltage.

4. The TRU battery charging system according to any of aspects 1-3, wherein the programmable BC is further programmed to dynamically characterize a load sourced by the programmable BC in response to the value of offset current drawn from the TRU battery by the programmable TRS Controller.

5. The TRU battery charging system according to any of aspects 1-4, wherein the programmable BC is further programmed to dynamically characterize a load sourced by the programmable BC in response to a value of programmable BC internal shunt current measured by the programmable BC.

6. The TRU battery charging system according to any of aspects 1-5, wherein the programmable BC is further programmed to dynamically characterize voltage, frequency and phase characteristics associated with AC generator output signals measured by the programmable BC.

7. The TRU battery charging system according to any of aspects 1-6, wherein the programmable BC is further programmed to operate in a bulk current charging mode based on the value of offset current drawn from the TRU battery by the programmable TRS Controller and subsequently communicated to the programmable BC by the programmable TRS Controller.

8. The TRU battery charging system according to any of aspects 1-7, wherein the programmable BC is further programmed to operate in an absorption charging mode based on the value of offset current drawn from the TRU battery by the programmable TRS Controller and subsequently communicated to the programmable BC by the programmable TRS Controller, wherein the programmable BC continues to charge the TRU battery at lower voltage and current levels subsequent to a TRU battery bulk charging mode.

9. The TRU battery charging system according to any of aspects 1-8, wherein the programmable BC is further programmed to operate in a float charging mode based on the value of offset current drawn from the TRU battery by the programmable TRS Controller and subsequently communicated to the programmable BC by the programmable TRS Controller, wherein the programmable BC continues to provide charge to the TRU battery at lower voltage and current levels subsequent to a TRU battery absorption charging mode.

10. A method of operating a transport refrigeration unit (TRU) battery charging system, the method comprising:

programming a programmable transport refrigeration system (TRS) Controller to measure a value of offset current drawn from a TRU battery by the programmable TRS Controller during a null mode voltage measurement of the TRU battery by a programmable battery charger connected to the TRU battery via a current path through the programmable TRS Controller; and communicating the value of offset current to the programmable battery charger such that the programmable battery charger operates in a desired stage of TRU battery charging based on the value of offset current.

11. A method of operating a transport refrigeration unit (TRU) battery charging system, the method comprising:

programming a programmable transport refrigeration system (TRS) Controller to intermittently measure a value of offset current (I_TRU_Shunt) drawn from a TRU battery by the programmable TRS Controller;

programming a programmable TRU battery charger (BC) to intermittently measure a load current (I_Batt) sourced via the programmable TRU battery charger;

intermittently communicating the value of TRS Controller offset current (I_TRU_Shunt) to the programmable TRU BC, wherein the programmable TRU BC is connected to the TRU battery via a current path through the programmable TRS Controller; and controlling a TRU battery charge mode of the programmable TRU BC based on an offset current value represented as (I_Batt)–(I_TRU_Shunt).

12. The method according to aspect 11, further comprising measuring a null-mode TRU battery voltage via the TRU BC.

13. The method according to aspect 12, further comprising, adjusting the measured null-mode TRU battery voltage based on the offset current value represented as (I_Batt)–(I_TRU_Shunt), wherein (I_Batt) is zero Amperes during the null-mode TRU battery voltage measurement.

14. The method according to aspect 13, further comprising, operating the programmable TRU BC in a bulk current charging mode based on the value of offset current drawn from the TRU battery by the programmable TRS Controller and subsequently communicated to the programmable BC by the programmable TRS Controller.

15. The method according to aspect 13 or 14, further comprising, operating the programmable TRU BC in an absorption charging mode based on the value of offset current drawn from the TRU battery by the programmable TRS Controller and subsequently communicated to the programmable BC by the programmable TRS Controller, such that the programmable TRU BC continues to charge the TRU battery at lower voltage and current levels subsequent to the TRU battery bulk charging mode.

16. The method according to any of aspects 13-15, further comprising, operating the programmable TRU BC in a float charging mode based on the value of offset current drawn from the TRU battery by the programmable TRS Controller and subsequently communicated to the programmable BC by the programmable TRS Controller, such that the programmable TRU BC continues to provide charge to the TRU battery at lower voltage and current levels subsequent to the TRU battery absorption charging mode.

While only certain features of the embodiments have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A transport refrigeration unit (TRU) battery charging system, comprising:
 a programmable transport refrigeration system (TRS) Controller;
 a TRU battery; and
 a programmable battery charger (BC) programmed to transfer electrical current to the TRU battery in response to a value of offset current drawn from the TRU battery by the programmable TRS Controller and subsequently communicated to the programmable BC by the programmable TRS Controller.

2. The TRU battery charging system according to claim 1, wherein the programmable BC is further programmed to transfer electrical current to the TRU battery in response to the value of offset current drawn from the TRU battery by the programmable TRS Controller during a null-mode measurement of the TRU battery voltage.

3. The TRU battery charging system according to claim 2, wherein the programmable BC is further programmed to operate in at least one of a bulk current mode, an absorption mode and a float mode based on the value of offset current drawn from the TRU battery by the programmable TRS Controller during the null-mode measurement of the TRU battery voltage.

4. The TRU battery charging system according to claim 1, wherein the programmable BC is further programmed to dynamically characterize a load sourced by the programmable BC in response to the value of offset current drawn from the TRU battery by the programmable TRS Controller.

5. The TRU battery charging system according to claim 1, wherein the programmable BC is further programmed to dynamically characterize a load sourced by the programmable BC in response to a value of programmable BC internal shunt current measured by the programmable BC.

6. The TRU battery charging system according to claim 1, wherein the programmable BC is further programmed to dynamically characterize voltage, frequency and phase characteristics associated with AC generator output signals measured by the programmable BC.

7. The TRU battery charging system according to claim 1, wherein the programmable BC is further programmed to operate in a bulk current charging mode based on the value of offset current drawn from the TRU battery by the programmable TRS Controller and subsequently communicated to the programmable BC by the programmable TRS Controller.

8. The TRU battery charging system according to claim 1, wherein the programmable BC is further programmed to operate in an absorption charging mode based on the value of offset current drawn from the TRU battery by the programmable TRS Controller and subsequently communicated to the programmable BC by the programmable TRS Controller, wherein the programmable BC continues to charge the TRU battery at lower voltage and current levels subsequent to a TRU battery bulk charging mode.

9. The TRU battery charging system according to claim 1, wherein the programmable BC is further programmed to operate in a float charging mode based on the value of offset current drawn from the TRU battery by the programmable TRS Controller and subsequently communicated to the programmable BC by the programmable TRS Controller, wherein the programmable BC continues to provide charge to the TRU battery at lower voltage and current levels subsequent to a TRU battery absorption charging mode.

10. A method of operating a transport refrigeration unit (TRU) battery charging system, the method comprising:
 programming a programmable transport refrigeration system (TRS) Controller to measure a value of offset current drawn from a TRU battery by the programmable TRS Controller during a null mode voltage measurement of the TRU battery by a programmable battery charger connected to the TRU battery; and
 communicating the value of offset current to the programmable battery charger such that the programmable battery charger operates in a desired stage of TRU battery charging based on the value of offset current.

11. A method of operating a transport refrigeration unit (TRU) battery charging system, the method comprising:
 programming a programmable transport refrigeration system (TRS) Controller to intermittently measure a value of offset current (I_TRU_Shunt) drawn from a TRU battery by the programmable TRS Controller;
 programming a programmable TRU battery charger (BC) to intermittently measure a load current (I_Batt) sourced via the programmable TRU battery charger;
 intermittently communicating the value of TRS Controller offset current (I_TRU_Shunt) to the programmable TRU BC, wherein the programmable TRU BC is connected to the TRU battery; and
 controlling a TRU battery charge mode of the programmable TRU BC based on an offset current value represented as (I_Batt)−(I_TRU_Shunt).

12. The method according to claim 11, further comprising measuring a null-mode TRU battery voltage via the TRU BC.

13. The method according to claim 12, further comprising, adjusting the measured null-mode TRU battery voltage based on the offset current value represented as (I_Batt)−(I_TRU_Shunt), wherein (I_Batt) is zero Amperes during the null-mode TRU battery voltage measurement.

14. The method according to claim 13, further comprising, operating the programmable TRU BC in a bulk current charging mode based on the value of offset current drawn from the TRU battery by the programmable TRS Controller and subsequently communicated to the programmable BC by the programmable TRS Controller.

15. The method according to claim 13, further comprising, operating the programmable TRU BC in an absorption charging mode based on the value of offset current drawn from the TRU battery by the programmable TRS Controller and subsequently communicated to the programmable BC by the programmable TRS Controller, such that the programmable TRU BC continues to charge the TRU battery at lower voltage and current levels subsequent to the TRU battery bulk charging mode.

16. The method according to claim 13, further comprising, operating the programmable TRU BC in a float charging mode based on the value of offset current drawn from the TRU battery by the programmable TRS Controller and subsequently communicated to the programmable BC by the programmable TRS Controller, such that the programmable TRU BC continues to provide charge to the TRU battery at lower voltage and current levels subsequent to the TRU battery absorption charging mode.

* * * * *